(No Model.) 2 Sheets—Sheet 1.

W. K. FREEMAN.
CURRENT COLLECTOR FOR DYNAMO ELECTRIC MACHINES.

No. 440,425. Patented Nov. 11, 1890.

WITNESSES
John F. Nelson
Alvan Macauley

INVENTOR
Walter K. Freeman.
By Church & Church
his ATT'y.

(No Model.) 2 Sheets—Sheet 2.

W. K. FREEMAN.
CURRENT COLLECTOR FOR DYNAMO ELECTRIC MACHINES.

No. 440,425. Patented Nov. 11, 1890.

WITNESSES.
John F. Nelson
Alvan Macauley

INVENTOR
Walter K. Freeman
by Church & Church
his attys.

UNITED STATES PATENT OFFICE.

WALTER K. FREEMAN, OF BROOKLYN, NEW YORK, ASSIGNOR TO WILLIAM S. HADAWAY, JR., TRUSTEE, OF BOSTON, MASSACHUSETTS.

CURRENT-COLLECTOR FOR DYNAMO-ELECTRIC MACHINES.

SPECIFICATION forming part of Letters Patent No. 440,425, dated November 11, 1890.

Application filed September 20, 1890. Serial No. 365,675. (No model.)

*To all whom it may concern:*

Be it known that I, WALTER K. FREEMAN, a citizen of the United States, and a resident of Brooklyn, in the county of Kings and State of New York, have invented certain new and useful Improvements in Current-Collectors for Dynamo-Electric Machines; and I do hereby declare the following to be a full and exact description thereof, which will enable others skilled in the art to which the invention appertains to make and use the same.

My invention relates to improvements in current-collectors for dynamo-electric machines; and it consists in certain novel improvements in construction, which I will first describe at large, and then point out particularly in the clauses of claim at the end of this specification.

Figure 1:
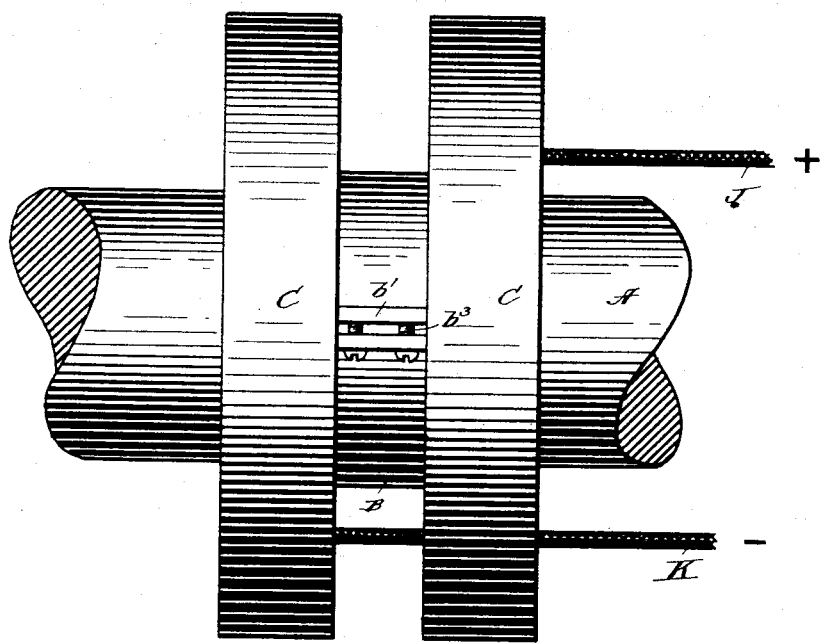
Figure 2:
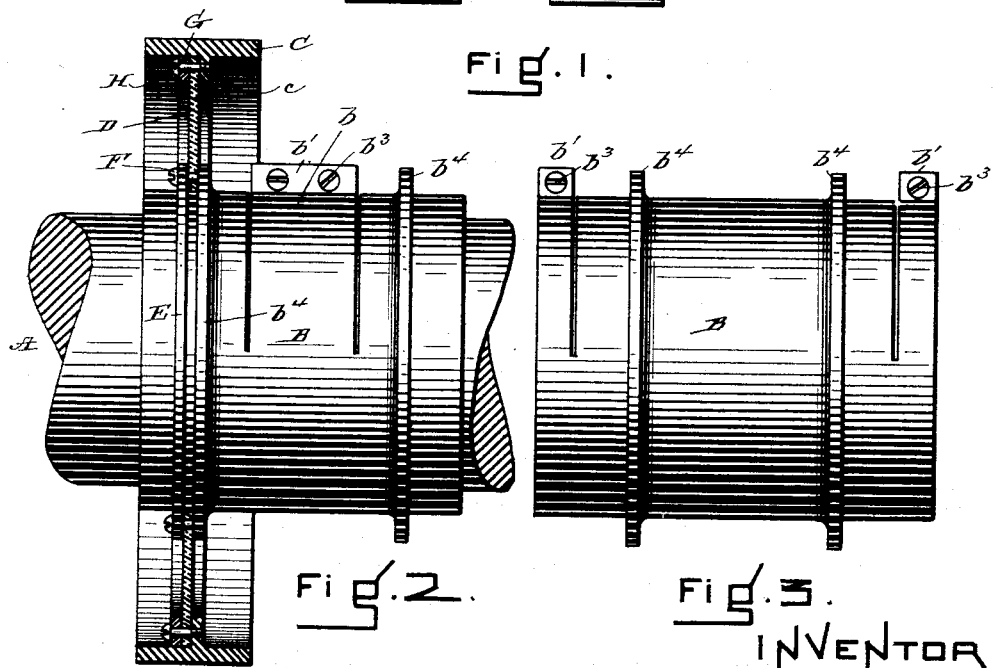
Figure 3:
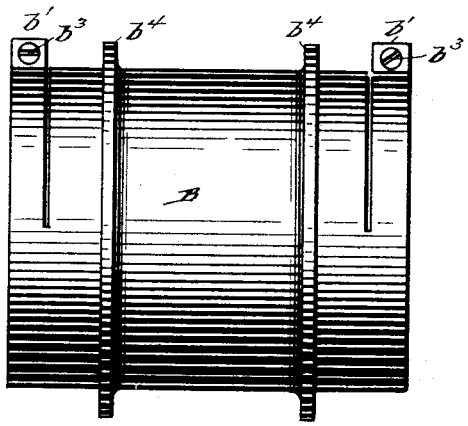
Figure 4:
Figure 5:
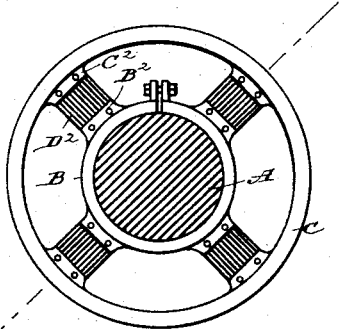
Figure 6:
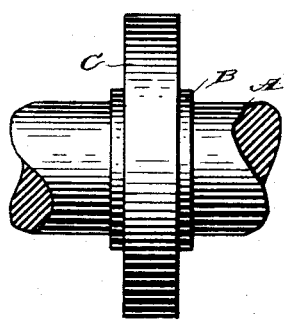
Figure 7:
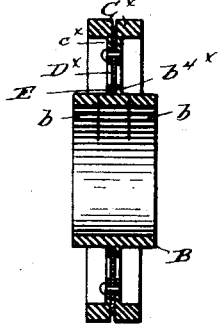
Figure 8:
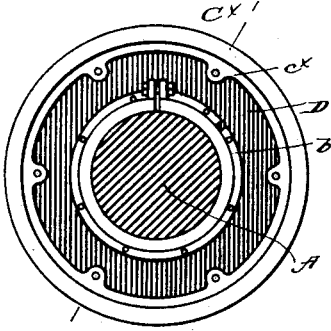
Figure 9:
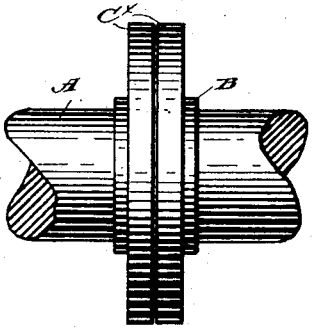
Figure 10:
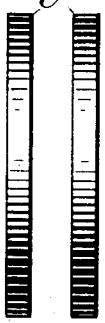
Figure 11:
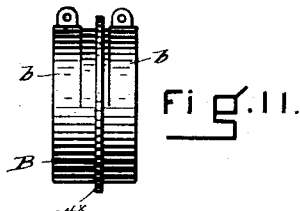
Figure 12:
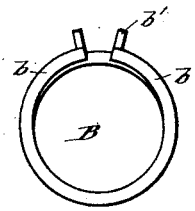
Figure 13:
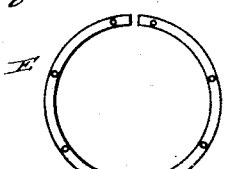

In the accompanying drawings, Figure 1 represents a plan view of a collector constructed in accordance with my invention applied to an armature-shaft. Fig. 2 is a transverse sectional view of the same with one ring removed. Fig. 3 is a view of a modification of the invention. Figs. 4, 5, and 6 are respectively a longitudinal section, an end elevation, and a side elevation of another modification. Figs. 7, 8, and 9 are respectively similar views of still another modification. Fig. 10 represents in elevation the outer rims of the collector shown in Fig. 7. Fig. 11 is a side view, and Fig. 12 an end view, of the hub of the same; and Fig. 13 is a view of one of the clamping-rings that clamps the insulating material to the flange of the hub.

Similar letters of reference in the several figures indicate the same parts.

Referring particularly to Figs. 1 and 2, A represents the armature-shaft; B, the hub of the collector; C, the outer rims, and D the insulating material interposed between the hub and the outer rims.

The hub B consists of a sleeve having an internal diameter approximating closely the diameter of the armature-shaft and having an adjustable split portion $b$, whose ends are provided with flanges $b'$, through which adjusting-screws $b^3$ pass. The hub B is further provided with peripheral flanges $b^4$—one on each side of the split portions—and to each of these flanges $b^4$ is secured, by a clamping-ring E and screws F, the ring of insulating material D. An inwardly-projecting flange $c$ is formed upon each of the rings C, and the insulating material D is in like manner clamped to said flange by a clamping-ring G and screws H. By manipulating the screws $b^3$ the collectors may be adjusted to the desired position on the armature-shaft and there held rigidly.

As shown in Fig. 1, one of the terminals J of the armature-coils is connected to one of the rims C and the other terminal K to the other of said rims.

In the modification shown in Fig. 3 the split and adjustable portions of the hub are located outside of the flanges $b^4$ instead of between said flanges, as in Figs. 1 and 2. Instead of forming the hub with two peripheral flanges and supporting one collector-rim upon each of said flanges, the hub may be provided with a single central flange, as shown at $b^{4\times}$ in Figs. 7 to 12, in which case the insulating material $D^\times$ would be clamped at its outer edge between flanges $c^\times$, formed upon the two collector-rims $C^\times$, as shown particularly in Fig. 7.

Another modification of the invention is shown in Figs. 4 to 6. Here the entire hub portion is split and its flanged ends provided with clamping-screws, and the rim is insulated from the hub by means of insulating-arms $D^2$, connected to lugs $B^2$ and $C^2$, formed upon the hub and rim, respectively. As this form of the invention provides but a single rim on a hub, it is required to be used in pairs, which are applied and adjusted separately.

Having thus described my invention, what I claim as new is—

1. In a collector for dynamos, the combination, with a metallic rim or hub having a peripheral projecting flange or flanges, of a metallic outer rim provided with inwardly-projecting flanges and insulating material interposed between said rim and hub and secured to the flanges thereof, substantially as described.

2. In a collector for dynamos, the combination, with a flanged metallic hub having a portion or portions of it split and provided with clamping devices, of an outer flanged metallic rim and intermediate insulating material secured to said flanged hub and rim, substantially as described.

3. In a collector for dynamos, the combination, with a metallic hub having multiple peripheral flanges and having a portion or portions of it split and provided with clamping devices, of a multiple of independent metallic rims and intermediate insulating material secured to said flanged hub and rims, substantially as described.

4. In a collector for dynamos, a metallic hub consisting, essentially, of a flanged sleeve having a split portion or portions provided with clamping devices, substantially as described.

5. In a collector for dynamos, the combination, with the hub B, provided with the peripheral flanges $b^4$, the split portion $b$, and its clamping devices, of the metallic flanged rims, the intermediate rings of insulating material D, the clamping-rings, and screws for securing said insulating material to the flanges of the hub and rims, respectively, substantially as described.

WALTER K. FREEMAN.

Witnesses:
MELVILLE CHURCH,
WILLIAM S. HADAWAY, Jr.